United States Patent
Nedorezov et al.

(10) Patent No.: US 10,183,663 B2
(45) Date of Patent: Jan. 22, 2019

(54) METHODS AND SYSTEMS FOR STARTING AN ENGINE

(71) Applicant: Ford Global Technologies, LLC, Dearborn, MI (US)

(72) Inventors: Felix Nedorezov, Rochester Hills, MI (US); Alexander O'Connor Gibson, Ann Arbor, MI (US); David Oshinsky, Trenton, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 498 days.

(21) Appl. No.: 14/462,401

(22) Filed: Aug. 18, 2014

(65) Prior Publication Data
US 2016/0046281 A1 Feb. 18, 2016

(51) Int. Cl.
*B60W 20/40* (2016.01)
*B60W 10/02* (2006.01)
*B60W 10/06* (2006.01)
*B60W 10/08* (2006.01)
*F02N 11/08* (2006.01)
(Continued)

(52) U.S. Cl.
CPC ............ *B60W 20/40* (2013.01); *B60K 6/387* (2013.01); *B60K 6/48* (2013.01); *B60W 10/02* (2013.01); *B60W 10/06* (2013.01); *B60W 10/08* (2013.01); *F02N 5/04* (2013.01); *F02N 11/04* (2013.01); *F02N 11/0851* (2013.01); *F02N 15/022* (2013.01); *F16F 15/131* (2013.01); *B60K 2006/268* (2013.01); *B60K 2006/4825* (2013.01); *B60W 2510/06* (2013.01); *B60W 2510/0638* (2013.01); *B60W 2510/0652* (2013.01); *B60W 2510/1005* (2013.01); *B60W 2530/145* (2013.01); *B60W 2550/12* (2013.01); *B60W 2710/021* (2013.01); *B60W 2710/025* (2013.01); *B60W 2710/0661* (2013.01); *B60W 2710/081* (2013.01); *F02N 2200/022* (2013.01); *Y02T 10/6221* (2013.01);
(Continued)

(58) Field of Classification Search
None
See application file for complete search history.

(56) References Cited

U.S. PATENT DOCUMENTS 4,133,325 A 1/1979 West
4,819,171 A 4/1989 Morita
(Continued)

OTHER PUBLICATIONS

Anonymous, "A Low Emission Engine Starting Strategy for Start/Stops," IPCOM No. 000240460, Published Jan. 30, 2015, 2 pages.
(Continued)

*Primary Examiner* — Shelly Chen
(74) *Attorney, Agent, or Firm* — David Kelley; McCoy Russell LLP (57) ABSTRACT

Methods and systems are provided for improving engine restart operations in a hybrid vehicle. While an engine is cranked via motor torque, engine fueling is delayed until the engine speed is sufficiently high and the engine has been rotating in a forward direction continuously for a threshold duration. A disconnect clutch between the engine and motor is slipped while the engine cranks, the clutch engaged only after the engine has run up to the motor speed.

20 Claims, 6 Drawing Sheets

(51) Int. Cl.
  *B60K 6/48* (2007.10)
  *F02N 5/04* (2006.01)
  *F02N 11/04* (2006.01)
  *F02N 15/02* (2006.01)
  *F16F 15/131* (2006.01)
  *B60K 6/387* (2007.10)
  *B60K 6/26* (2007.10)

(52) U.S. Cl.
  CPC ........ *Y02T 10/6252* (2013.01); *Y02T 10/6286* (2013.01); *Y10S 903/93* (2013.01)

(56) References Cited

U.S. PATENT DOCUMENTS

| | | | |
|---|---|---|---|
| 5,886,625 | A | 3/1999 | Uta et al. |
| 7,896,114 | B2 | 3/2011 | Colvin et al. |
| 8,157,035 | B2 | 4/2012 | Whitney et al. |
| 8,343,615 | B2 | 1/2013 | Raksha et al. |
| 8,386,150 | B2 | 2/2013 | Whitney et al. |
| 8,602,941 | B2 | 12/2013 | Cullen et al. |
| 8,628,451 | B2 | 1/2014 | Sah et al. |
| 2007/0080005 | A1* | 4/2007 | Joe ............... B60K 6/48 180/65.245 |
| 2008/0302324 | A1* | 12/2008 | Aswani ........... B60K 6/485 123/179.3 |
| 2009/0018757 | A1* | 1/2009 | Kobayashi ....... B60W 10/026 701/112 |
| 2009/0308674 | A1 | 12/2009 | Bhattarai et al. |
| 2011/0021312 | A1* | 1/2011 | Fukitani ............. B60K 6/48 477/5 |
| 2011/0136620 | A1* | 6/2011 | Gibson ............. B60W 10/02 477/64 |
| 2011/0136622 | A1* | 6/2011 | Enoki ............. B60W 10/02 477/83 |
| 2012/0028749 | A1* | 2/2012 | Kawasaki ........... B60K 6/48 475/211 |
| 2012/0065819 | A1 | 3/2012 | Christman et al. |
| 2013/0296108 | A1 | 11/2013 | Ortmann et al. |
| 2013/0297105 | A1* | 11/2013 | Yamazaki ............. B60K 6/48 701/22 |
| 2013/0304293 | A1* | 11/2013 | Yoshikawa .......... B60K 6/48 701/22 |
| 2014/0088805 | A1* | 3/2014 | Tulpule ............. B60K 6/442 701/22 |
| 2014/0100081 | A1 | 4/2014 | Cullen et al. |
| 2014/0100082 | A1 | 4/2014 | Gibson et al. |
| 2015/0239468 | A1* | 8/2015 | Nakanishi ........... B60K 6/48 477/167 |
| 2016/0214601 | A1* | 7/2016 | Ito ................. B60K 6/48 |

OTHER PUBLICATIONS

Yamazaki, Mark S. et al., "Methods and Systems for Starting an Engine," U.S. Appl. No. 14/462,405, filed Aug. 18, 2014, 43 pages.

\* cited by examiner

METHODS AND SYSTEMS FOR STARTING AN ENGINE

FIELD

The present description relates to systems and methods for improved engine position estimation and accurate fueling of an engine during an engine restart. The engine may be selectively coupled to an electrical machine and a transmission in a hybrid electric vehicle.

BACKGROUND AND SUMMARY

Hybrid electric vehicles (HEV's) utilize a combination of an internal combustion engine with an electric motor to provide the power needed to propel a vehicle. This arrangement provides improved fuel economy over a vehicle that has only an internal combustion engine in part due to the engine being shut down during times when the engine operates inefficiently, or is not otherwise needed to propel the vehicle. During these conditions, the vehicle is transitioned from an engine mode to an electric mode where the electric motor is used to provide all of the power needed to propel the vehicle. When the driver power demand increases such that the electric motor can no longer provide enough power to meet the demand, or if the battery state of charge (SOC) drops below a certain level, the engine is restarted quickly and smoothly in a manner that is nearly transparent to the driver. Vehicle propulsion is then transitioned from an electric mode to an engine mode.

One method of enabling a smooth engine restart in an HEV powertrain is disclosed by Tulpule et al. in US 20140088805. Therein, a disconnect clutch is disposed between an engine and a motor, which is operable to disconnect the engine from the motor. During an engine restart, the disconnect clutch is disengaged so that the engine can be fueled to obtain a speed that matches the motor speed. Then, when the engine speed matches the motor speed, the disconnect clutch is engaged to couple the engine and the motor to the drive shaft to meet the driver torque demand.

However the inventors herein have recognized potential issues with such an approach. Sufficient disconnect clutch capacity may need to be maintained during the restart to enable the engine to crank through the cylinder compression torque until combustion is initiated. However, depending on the engine position at shutdown, engine piston friction variation, disconnect clutch coefficient of friction variation and other noise factors, it may be challenging to calculate the engine cranking torque required to achieve the desired engine crank and smooth restart performance. If the estimated cranking torque is too low, the engine may not cross through the cylinder compression torque which will cause the engine to rotate first forward and then backward. The resulting crankshaft reversal response can negatively impact the restart response time and lead to NVH issues. In particular, if the engine is rotating backwards at a time when fueling is resumed and the clutch capacity is relatively low, the engine restart may be degraded and the vehicle may stall. In addition to the injected fuel being wasted, additional fuel may be required to restart the engine, degrading fuel economy. Further still, the incomplete engine start may cause a torque disturbance in the vehicle driveline, which in turn can lead to significant NVH issues during the restart.

The inventors have recognized these issues and developed a method for a hybrid vehicle with an improved engine restart method. In one example, the method comprises, during an engine restart, cranking an engine via a motor with a disconnect clutch between the engine and the motor at least partially disengaged while delaying fueling of the engine until only after an engine speed is above a threshold speed and a direction of engine rotation is positive for greater than a threshold duration. In this way, engine fueling may be initiated without incurring crankshaft reversal issues.

In one example, in response to an engine restart request in a hybrid electric vehicle system, the engine may be cranked via an electric motor. While the engine is cranked, a disconnect clutch coupled between the engine and motor may be maintained partially disengaged, with a slippage of the clutch continually adjusted based on a difference between the engine speed and the motor speed. A controller may monitor the engine speed as well as the derivative of the engine speed once the engine starts rotating. Fueling of the engine may be delayed until the controller confirms that the engine speed is higher than a threshold speed as well as the engine rotation is in a positive direction for a threshold amount of time. For example, the controller may compare a preselected number of engine readings to make sure that each consecutive reading is greater than the previous one to confirm that the engine is rotating in the forward direction. Upon confirming that no engine reversals have occurred, engine fueling is resumed. The disconnect clutch is then engaged when the engine speed is within a threshold of the motor speed. In some examples, based on the motor acceleration and the engine acceleration, a motor speed at the desired time of clutch engagement may be predicted, and engine fueling may be adjusted in accordance to expedite transition from the electric mode to the hybrid mode of vehicle operation.

In this way, a quality of engine restarts in a hybrid electric vehicle may be improved. By delaying fueling of an engine following cranking by a motor until the engine speed profile is indicative of positive engine rotation, vehicle stalls can be reduced. By preempting engine fueling during crankshaft reversal, fuel wastage and driveline torque disturbances can be reduced. Overall, a smoother engine restart with reduced NVH issues is enabled, improving operator drive experience.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
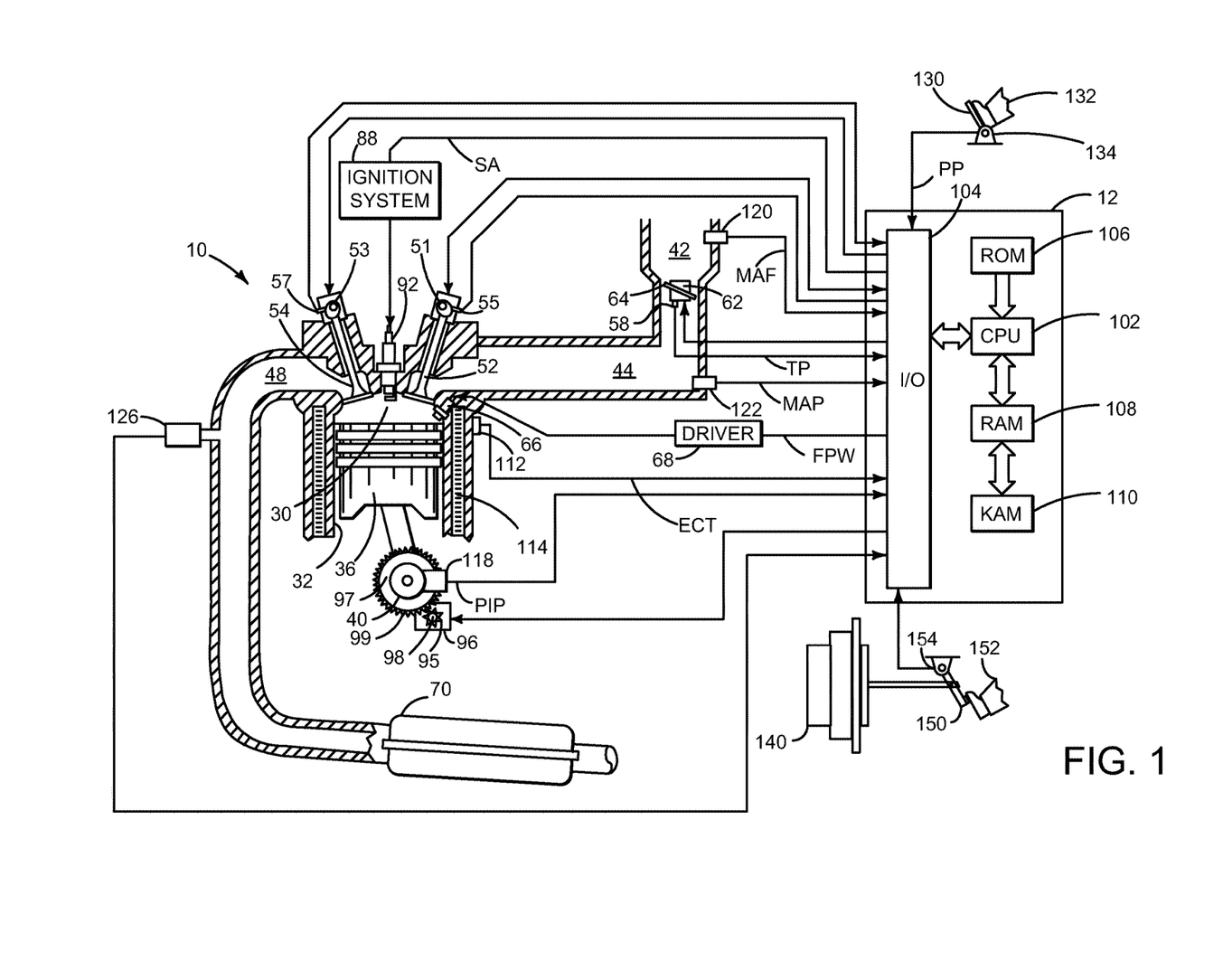
FIG. 1 is a schematic diagram of an engine.
Figure 2:
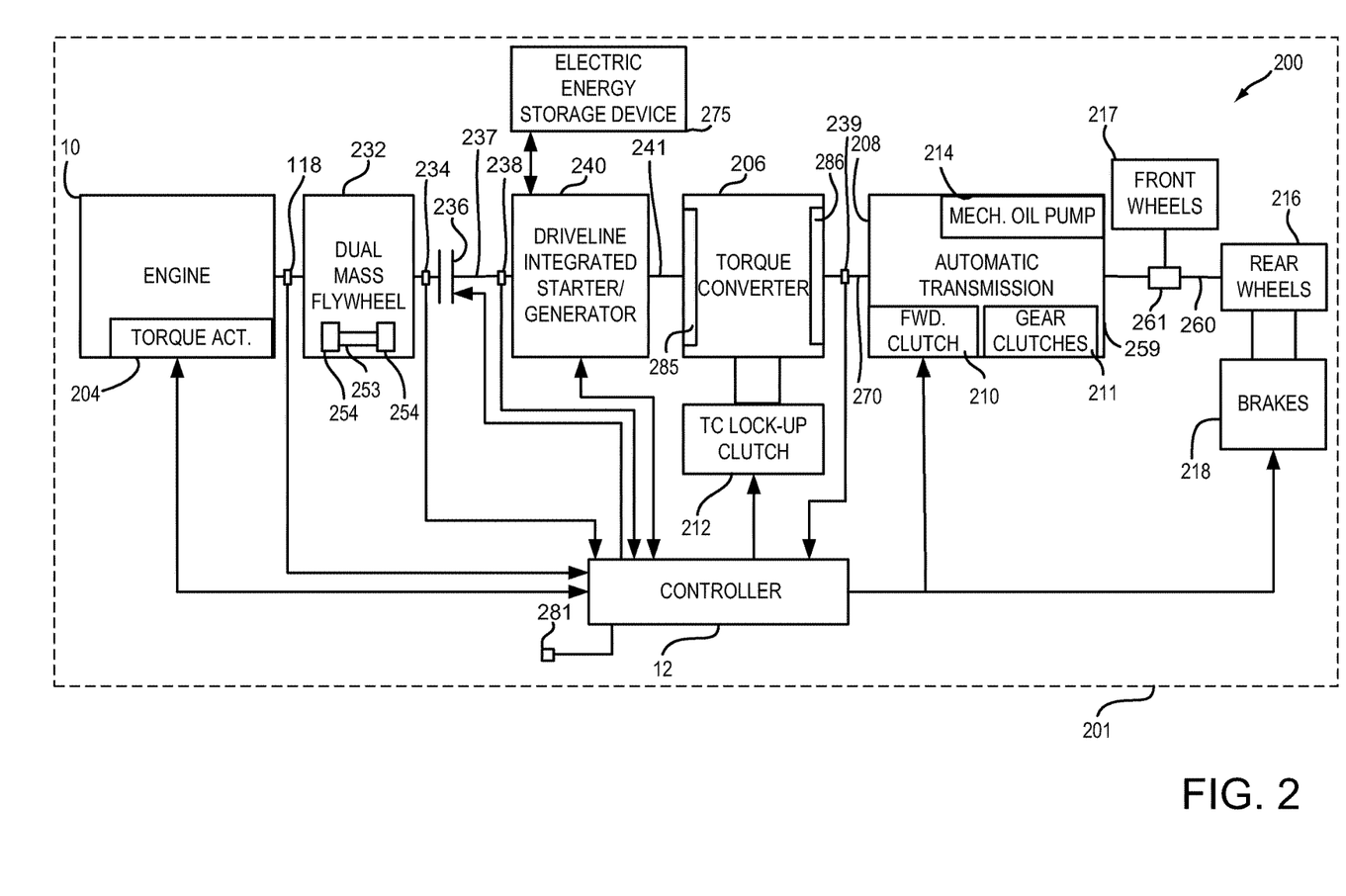
FIG. 2 shows an example driveline configuration for a hybrid electric vehicle.
Figure 5:
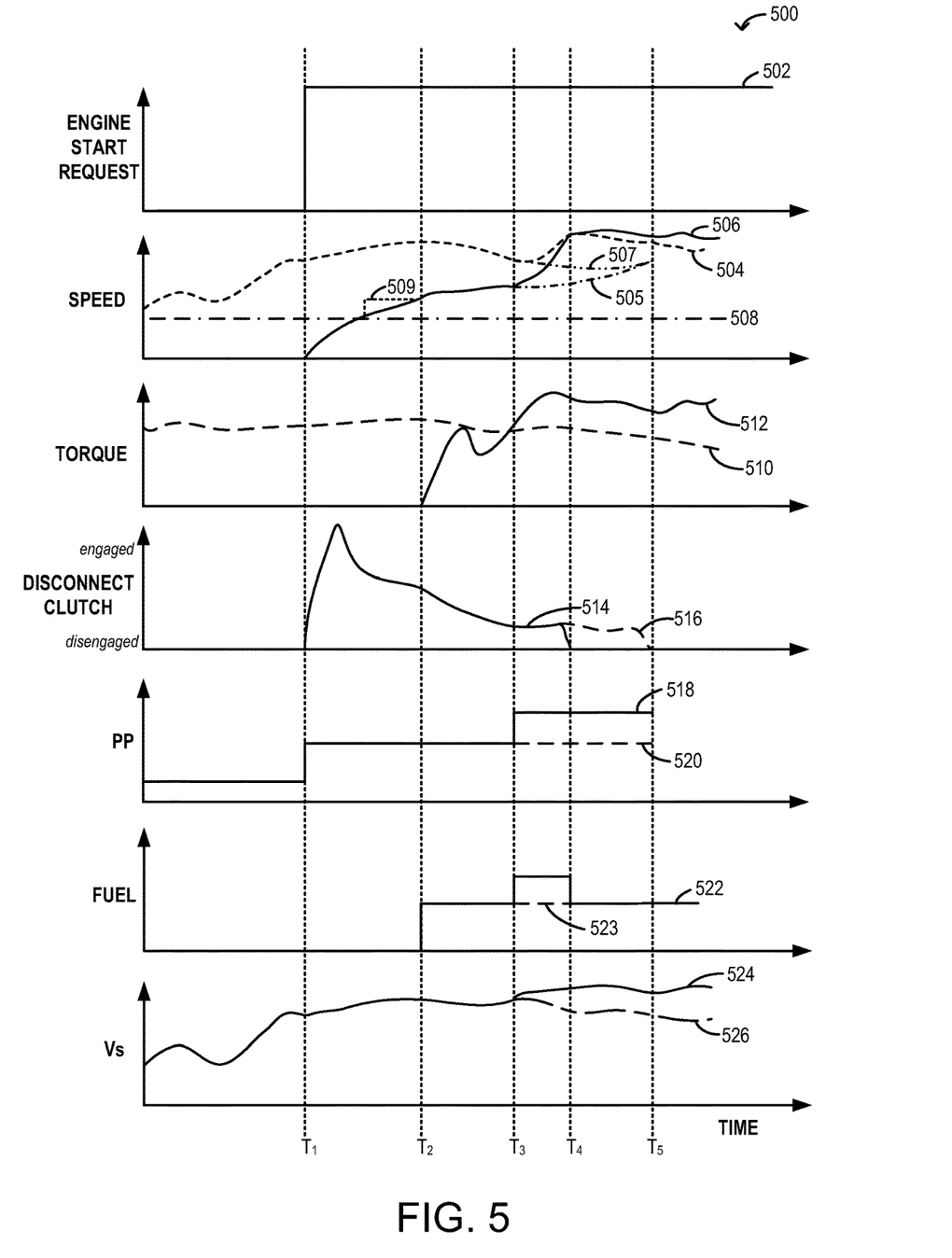
FIGS. 5-6 show example engine restart sequences.
Figure 6:
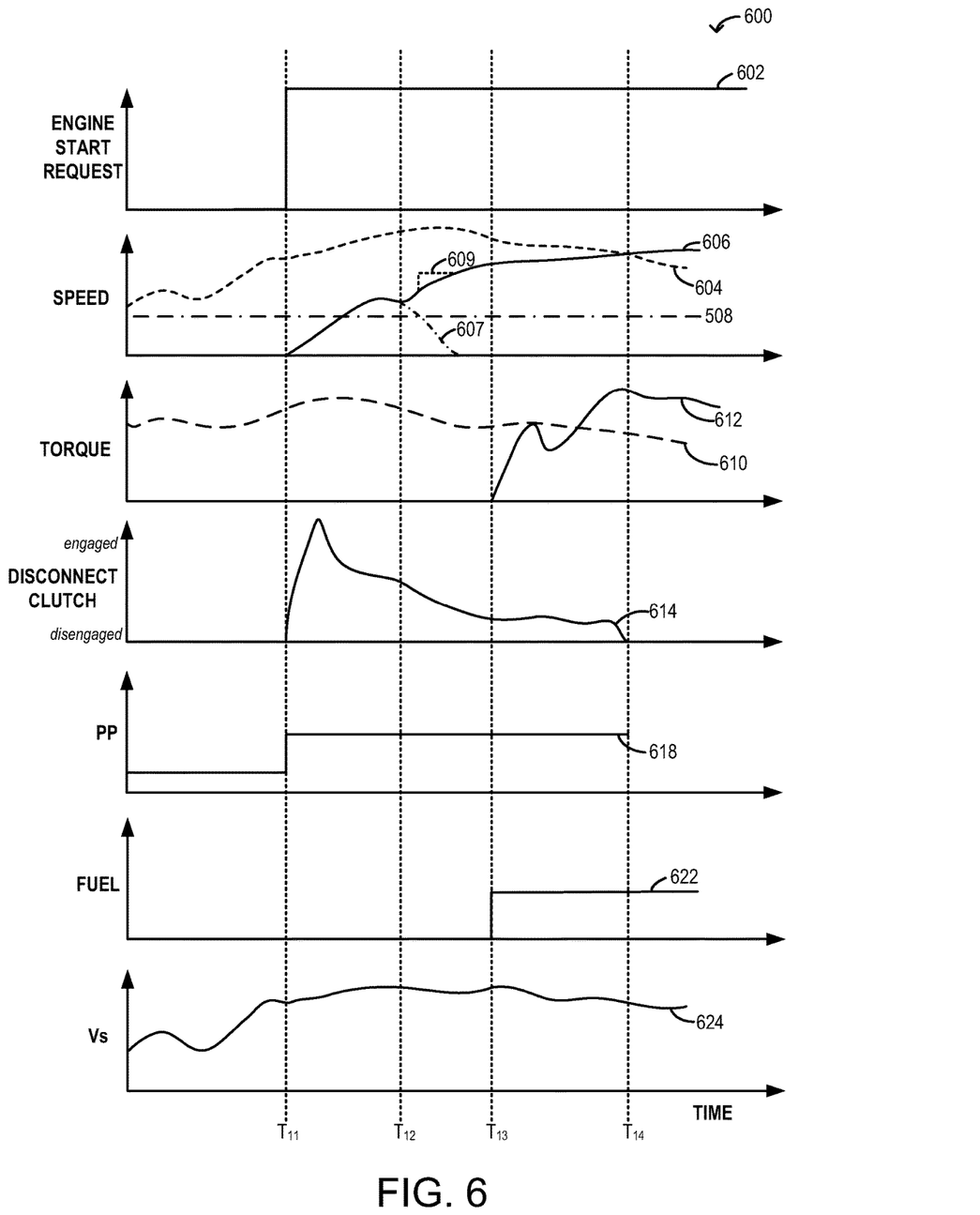

Methods and systems are provided for enabling smooth engine restarts in a hybrid electric vehicle, such as the vehicle system of FIGS. 1-2. During conditions when an engine restart is requested, the engine may be cranked via a motor with engine fueling delayed until the positive engine rotation is confirmed. A vehicle controller is configured to perform a control routine, such as the example routines of FIGS. 3-4, to crank the engine using motor torque while slipping a disconnect clutch coupled between the engine and the motor. Engine fueling is resumed only upon confirming that the engine speed is sufficiently high and the engine acceleration is indicative of positive engine rotation. Example engine restart sequences are shown at FIGS. 5-6. In this way, a smooth engine restart is achieved.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a driveline integrated starter/generator (DISG) may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via a driveline integrated starter/generator DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

When disconnect clutch 236 is fully engaged, the engine output shaft is coupled to the DISG, allowing the motor to start the engine, such as during an engine restart. In contrast, when disconnect clutch 236 is fully disengaged, the engine may be disconnected from the electric machine. Disconnecting the engine from the electric machine allows the electric machine to propel the vehicle without having to overcome parasitic engine losses. Further still, the disconnect clutch may be partially engaged and slipped to vary the disconnect clutch's torque capacity. As elaborated at FIG. 3, controller 12 may be configured to adjust the amount of torque transmitted to crank the engine by adjusting the disconnect clutch 236 during an engine restart. In addition, while cranking the engine via motor torque from the DISG, the controller may resume fueling of the engine only after confirming that the engine rotation is in a positive direction and the engine speed is above a threshold speed. By delaying fueling until the motor torque is able to spin the engine while overcoming the engine's compression torque, engine reversals and fueling of the engine during an engine reversal is reduced. As such, this reduces the occurrence of vehicle stalls during an engine restart operation.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 206 by adjusting the torque converter lock-up clutch 212 in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are met, when the vehicle speed is close to zero, or other engine shutdown conditions are met, such as when the engine is shutdown at higher speeds (e.g. during electric only or brake regeneration operation), controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle.

If the vehicle is being launched from zero speed, a wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted. When restart conditions are satisfied, and/or a vehicle operator wants to launch the vehicle, controller 12 may reactivate the engine by resuming cylinder combustion.

Thus, in the vehicle system of FIGS. 1-2, the vehicle is equipped with a modular hybrid transmission (MHT). As described above, the powertrain has a conventional step ratio automatic transmission in which a "front module", with the electric machine (the DISG) and the disconnect clutch, is inserted between the engine and the transmission input. The DISG is thereby permanently connected to the transmission input (e.g., to the torque converter impeller or to a launch clutch). The disconnect clutch is then used to connect or disconnect the engine, thereby making electric only drive possible.

As such, engine starts are accomplished by controlling the disconnect clutch to vary torque provided from the electric machine to crank the engine. When the engine is rotated a sufficient number of crank angle degrees, fuel and spark is then applied to accelerate the engine crankshaft, and/or flywheel, to the synchronous, or output, speed of the disconnect clutch. As the output side of the disconnect clutch is rigidly connected to the transmission input through the electric machine rotor, the disconnect clutch output is equal to the transmission input speed. To reduce drive line disturbance during the engine restart event, as described below, a controller may reduce disconnect clutch torque capacity or maintain it at a level when significant clutch slip allows the engine to run up to the synchronous speed. At that point the disconnect clutch can be fully applied or engaged without noticeable torque disturbance. The disconnect clutch torque applied during the restart is adjusted to be sufficient to ensure that the engine can crank through the cylinder compression torque until combustion is initiated but not so high that the electric machine torque available to accelerate the vehicle would be insufficient. In one system implementation, a vehicle controller calculates the engine cranking torque and sends this information to the disconnect clutch controller. The disconnect clutch controller then calculates the pressure to generate the desired disconnect clutch torque capacity matching the required engine torque. To improve the engine restart smoothness the commanded clutch torque capacity is reduced prior to the first combustion event, e.g. applying the first fuel injection, to avoid a torque reversal at the disconnect clutch output, and the resulting driveline NVH, that occurs once the engine goes from negative to positive as combustion begins. However, the inventors have observed that depending on various engine conditions (such as engine shutdown position, engine piston friction variation, disconnect clutch coefficient of friction variation and other noise factors), there may be errors in calculating the engine cranking torque required to achieve the desired engine crank and smooth restart performance. When the calculated cranking torque is too low, the engine is unable to cross through the cylinder compression torque, resulting in a crankshaft reversal response.

Figure 3:
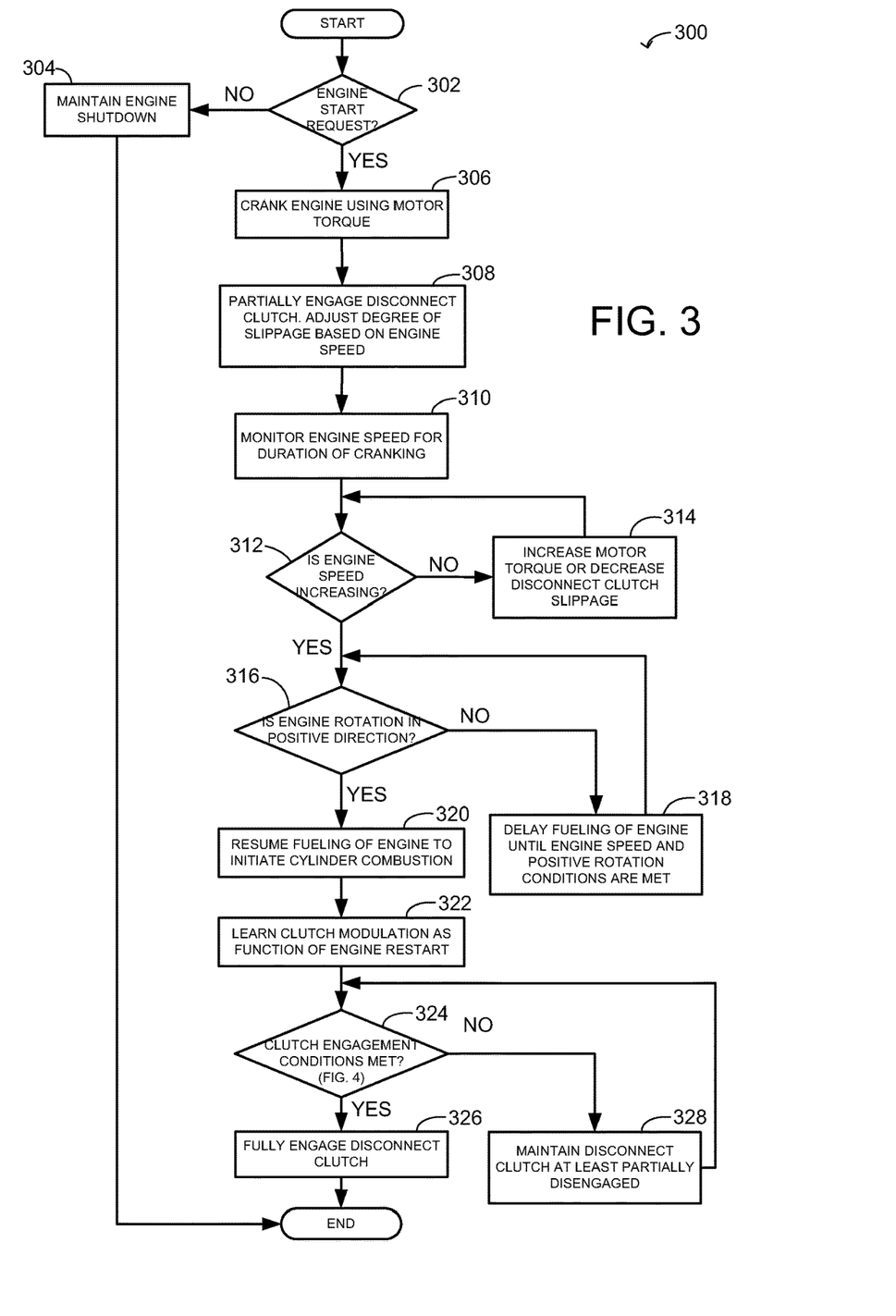
FIGS. 3-4 show example methods for restarting an engine of a hybrid electric vehicle.
Figure 4:
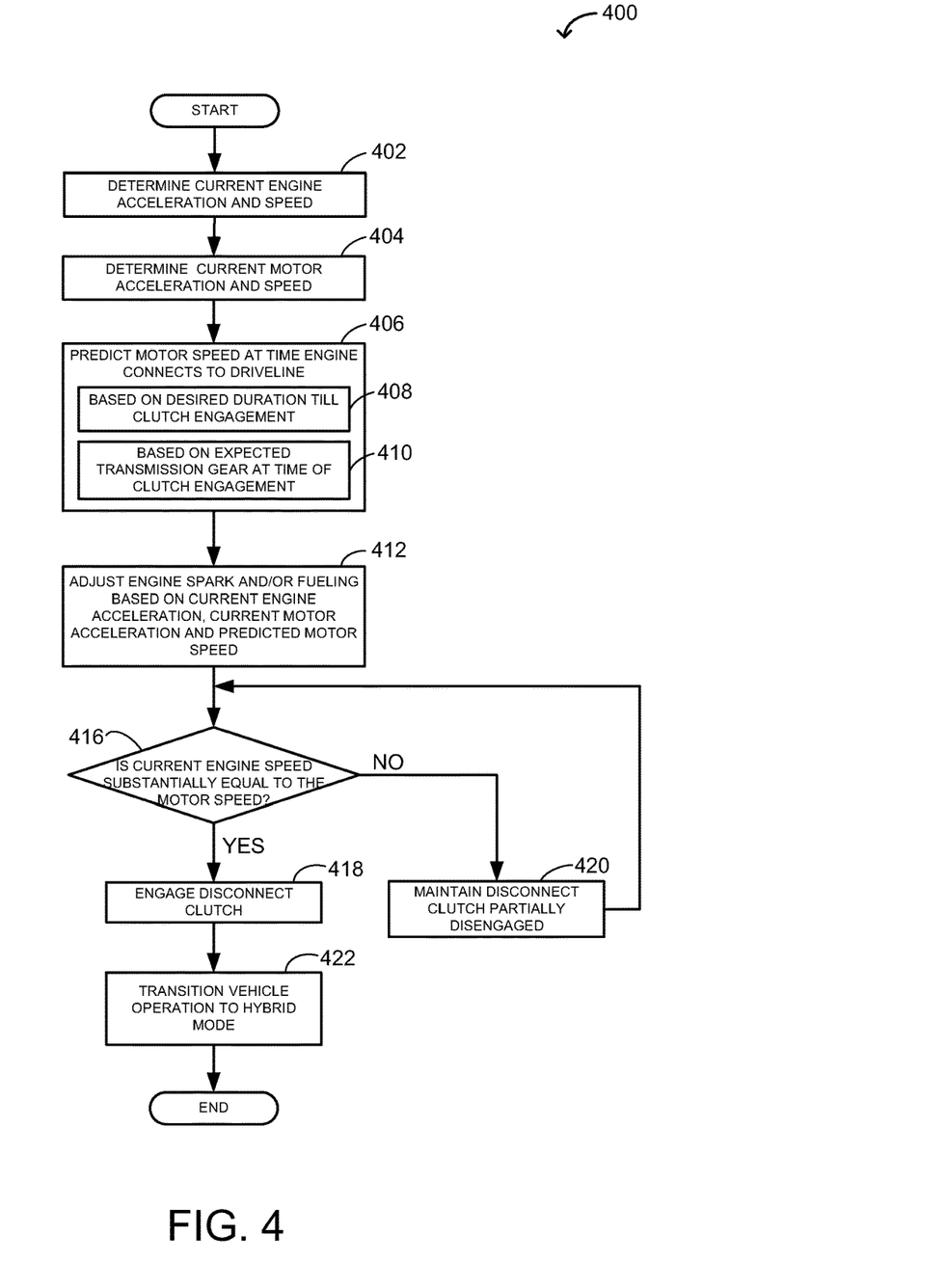

As elaborated herein, with reference to the methods of FIGS. 3-4, a controller may smoothly restart an engine during an engine restart using the system of FIGS. 1-2. In the method, an engine is cranked via a motor (such as the DISG) with a disconnect clutch between the engine and the motor at least partially disengaged while delaying fueling of the engine until only after an engine speed is above a threshold speed and a direction of engine rotation is positive for greater than a threshold duration. In this way, a smooth engine restart is enabled with reduced occurrence of vehicle stalls.

Now turning to FIG. 3, an example method 300 for smoothly starting an engine is provided. In one example, the engine is restarted while the vehicle is operated using motor torque in an electric drive mode to transition the vehicle to being operated in a hybrid mode based on the user's torque demands. In an alternate example, the engine is restarted to launch the vehicle. The method ensures that engine fueling is resumed only after an engine speed is above a threshold speed and a direction of engine rotation is positive for greater than a threshold duration. By fueling the engine upon confirming that the engine is not undergoing any reversals, vehicle stalls during engine restarts are preempted.

At 302, the routine includes confirming that an engine restart request has been received. The engine restart may be requested responsive to an increased torque demand from a vehicle operator. As another example, an engine restart may be requested responsive to a system battery state of charge being lower than a threshold. If an engine restart request is confirmed, routine 300 proceeds to 306. Otherwise, the routine proceeds to 304 where the engine is maintained shut down.

At 306, the routine includes cranking the engine via a motor. In particular, the engine is cranked from rest (that is, 0 rpm). In one example, the engine may be cranked using motor torque from the DISG. In an alternate example, the engine may be cranked using at least some motor torque from a starter motor. Cranking the engine via the motor may include transiently increasing the torque output of the motor so as to provide sufficient torque to propel the vehicle and crank the engine. At 308, a disconnect clutch between the engine and the motor may be at least partially disengaged while the motor is operated at the increased torque output. That is, the engine may be cranked via the motor with the disconnect clutch at least partially disengaged. The disconnect clutch being at least partially disengaged includes the disconnect clutch being slipped. A degree of slippage of the disconnect clutch may be adjusted based on engine speed. For example, the degree of slippage may be adjusted based on the rate of change of engine speed during the cranking, that is, based on the engine acceleration. In another example, the degree of slippage may be adjusted based on a difference between the engine speed and the motor speed across the disconnect clutch. By partially disengaging the disconnect clutch, and varying the degree of slippage of the clutch, the clutch's torque capacity is varied while the engine is started, without a loss of output torque delivered to the drive wheels.

It will be appreciated that slip control or slip feedback may be one non-limiting approach to controlling the engine restart speed profile. In alternate example, the controller may use engine speed feedback to control the engine restart speed profile. In particular, since the slip speed is closely related to the engine speed profile, by controlling the slip speed profile, a desired engine speed profile may be achieved. The clutch slip may be related to the engine speed profile in that slip is equal to the disconnect clutch input speed (neglecting any DMF oscillation) minus the disconnect clutch output speed. Thus, the DISG speed may be used as the input speed and slip may be adjusted to achieve a desired engine speed profile. In still further examples, the disconnect clutch may have an apply pressure sensor, in which case an outer feedback loop may be used based on desired engine speed profile and an inner feedback loop may be used based on clutch apply pressure. Herein, the inner feedback loop may be used to increase system responsiveness. As the output side of the disconnect clutch is rigidly connected to the transmission input through the electric machine rotor, the disconnect clutch output is equal to the transmission input speed. Thus, to reduce driveline disturbances during the engine restart event, the disconnect clutch torque capacity is reduced and maintained at a level when significant clutch slip allows the engine to run up to a synchronous speed. Once the engine speed is up to the motor's synchronous speed, the disconnect clutch can be fully applied without noticeable torque disturbance. As such, the disconnect clutch torque applied during the restart is adjusted to be high enough to ensure that the engine can crank through the cylinder compression torque until combustion is initiated but not so high that the electric machine torque available to accelerate the vehicle is insufficient. In one example, the engine controller may calculate the engine cranking torque and then calculate the disconnect clutch pressure required to generate the desired disconnect clutch torque capacity matching the required engine torque. To improve the engine restart smoothness, the commanded clutch torque capacity is reduced prior to the first combustion event, to avoid a torque reversal at the disconnect clutch output, and the resulting driveline NVH, that occurs once the engine goes from negative to positive as combustion begins.

At 310, the routine includes monitoring the engine speed over a duration of the engine cranking. Monitoring the engine speed includes determining a change in the engine speed over the duration of the cranking via motor torque, such as by monitoring the derivative of the engine speed. At 312, it may be determined if the engine speed is higher than a threshold. For example, it may be determined if the engine speed is higher than a threshold speed where engine is likely to start if fuel is supplied to the engine, assuming no engine reversals occur. For example, it may be determined if the engine speed is higher than 150-200 RPM. In other examples, an alternate minimum engine speed that enables expedited engine cranking/restart times but reduced NVH issues may be applied. The controller may compare a pre-selected number of engine speed readings to determine that the engine is accelerating by the amount that is expected based on the commanded disconnect clutch torque capacity. For example, it may be confirmed that the engine acceleration (a) is equal to the commanded clutch capacity (Tcap) minus the calculated compression torque (Tcomp), divided by the total inertia of the crankshaft plus the flywheel, including the engine side of the disconnect clutch (I). That is, it may be confirmed that:

$$a = (Tcap - Tcomp)/I$$

As such, until it is confirmed that the engine is rotating with the desired acceleration, the disconnect clutch torque may continue to be modulated to achieve the desired acceleration.

If the engine speed is higher than the threshold speed, it may be determined that the engine has been sufficiently cranked. If the engine speed is not higher than the threshold speed, then at 314, the routine includes increasing the motor torque supplied to crank the engine, such as by increasing the motor speed. Alternatively, or additionally, the slippage of the disconnect clutch may be decreased so as to increase the torque capacity if the disconnect clutch. For example, the clutch pressure may be increased. The routine may then return to 312 to reconfirm that the engine speed is higher than the threshold speed.

If the engine speed is higher than the threshold speed, then at 316, the routine includes confirming that the engine is rotating in the positive (that is, forward) direction. In particular, it may be determined that a direction of engine rotation is positive for greater than a threshold duration of the cranking. The direction of engine rotation being positive may be based on the rate of change of engine speed during the cranking or on engine restart crankshaft acceleration. In particular, the direction of engine rotation being positive may be based on a series of engine speed readings over the threshold duration having a progressively larger speed value. In one example, the controller compares a pre-selected number of engine speed readings to ensure that each consecutive reading is greater than the previous one so as to assure that the engine is rotating in the forward or positive direction with no engine reversal. As such, until it is confirmed that the engine is rotating in the forward direction with the desired crankshaft acceleration, the disconnect clutch torque may continue to be modulated to achieve the desired engine acceleration in the forward direction.

If positive engine rotation is not confirmed, then at 318, the routine includes delaying fueling of the engine. In particular, fueling of the engine is delayed until only after the engine speed is above a threshold speed and the direction of engine rotation is positive for greater than the threshold duration. If positive engine rotation is confirmed, then at 320, the routine includes fueling the engine only after the engine speed is above the threshold speed and the direction of engine rotation is positive for greater than the threshold duration. Fueling of the engine is resumed to initiate cylinder combustion and eventually operate the vehicle using engine torque.

At 322, the disconnect clutch modulation is learned as a function of the given engine restart. For example, the controller may learn the slipping of the disconnect clutch at the engine restart as a function of one or more of engine age, ambient temperature, ambient humidity, and hydraulic fluid temperature. By comparing the commanded clutch capacity and slippage over multiple restart events, the commanded clutch capacity and degree of slippage during the given restart event can be adapted to correct for vehicle-to-vehicle or clutch-to-clutch variability, as well as wear over time and changes due to environmental changes. For example, the clutch modulation for a given engine restart may be adjusted to compensate for hot or cold ambients, hot or cold hydraulic fluid temperatures, differences in hydraulic fluid conditions, and changes in humidity that may impact the clutch friction material. This may be particularly important if a dry clutch disconnect clutch design is used, although the same may also be used for a wet clutch design.

At 324, it may be determined if disconnect clutch engagement conditions have been met. As elaborated at FIG. 4, after resuming fueling of the engine, the disconnect clutch is engaged when the engine speed is at or within a threshold of an expected or synchronous motor speed. If clutch engagement conditions are not met, at 328, the disconnect clutch is maintained at least partially disengaged with the clutch being slipped, the slippage adjusted based on the engine speed relative to the motor speed. Else, if clutch engagement conditions are met, at 326, the routine includes fully engaging the disconnect clutch.

Now turning to FIG. 4, an example method 400 is shown for adjusting disconnect clutch engagement following engine fueling during an engine restart event.

At 402, the routine includes determining a current engine speed and engine acceleration while the engine is being cranked via motor torque with the disconnect clutch being slipped. In one example, the current engine speed may be determined based on the output of a crankshaft position sensor. The controller may determine an instantaneous engine speed as well as a rate of change (or derivative) of the engine speed. As such, the combination of the instantaneous engine speed and the derivative of the engine speed provide an indication regarding a trend in the change in engine speed (e.g., how fast the engine speed is increasing). Further still, the controller may determine if the actual engine speed or gradient matches a pre-calculated desired engine speed and/or gradient profile.

At 404, the routine includes determining a current speed and acceleration of the motor cranking the engine. For example, the speed of the DISG motor may be determined via a speed sensor coupled to the motor. The controller may determine an instantaneous motor speed as well a rate of change (or derivative) of the motor speed. As such, the combination of the instantaneous motor speed and the derivative of the motor speed provide an indication regarding a trend in the change in motor speed (e.g., how fast the motor speed is increasing). Further still, the controller may determine if there is any error in these values when compared to the desired profile values, which can then be used in feedback control strategy.

At 406, the routine includes predicting a motor speed expected at a time of disconnect clutch engagement. In one example, at 408, the expected motor speed is based on a desired duration till disconnect clutch engagement and further predicted based on a derivative of the (current) motor speed after resuming engine fueling. For example, if is it desired to engage the clutch at t seconds after resuming engine fueling, based on the derivative of the motor speed (or the current motor acceleration), the synchronous motor speed expected at t seconds from the time of engine fueling may be determined.

In another example, at 410, the expected motor speed is predicted based on an expected transmission gear selection during the engine restart. For example, the controller may predict a transmission gear selection (e.g., an upshift or a downshift from a current transmission gear selection) at a time of the clutch engagement based on vehicle operating conditions (e.g., vehicle speed). As such, based on the transmission gear selection, the synchronous motor speed may change. In doing so, the engine restart may be completed before the beginning of a 'ratio change' when the on-coming clutch begins to apply significant pressure (e.g., the inertia phase during an upshift). As such, by avoiding restarting the engine during the 'ratio change', engine restarting when the engine torque modulation is requested is avoided.

At 412, the routine includes adjusting fueling and/or spark timing to the engine based on a difference between the current engine speed and the expected motor speed. The adjusting may be further based on a derivative of the current engine speed after resuming engine fueling (indicative of the engine speed trajectory) and a derivative of the current motor speed after resuming engine fueling (indicative of the motor speed trajectory). This allows an engine torque to be adjusted responsive to the predicted synchronous motor speed. In particular, based on the engine speed trajectory and the motor speed trajectory, it may be determined if the engine speed will match the synchronous motor speed at the desired time of clutch engagement. As such, if the disconnect clutch is engaged while the engine speed and motor speed are not matched, driveline torque disturbances may occur which can lead to significant NVH issues (e.g., sudden jerks). In one example, if the engine speed is expected to be lower than the predicted motor speed at a desired time of clutch engagement, or if the predicted synchronous motor speed is higher than the current motor speed, the controller may adjust one or more fuel, air, and spark to the engine to increase engine acceleration. For example, fuel and/or air may be transiently increased and spark timing may be retarded to increase engine acceleration. Herein, by increasing fueling and/or retarding spark timing, a difference between the engine speed and the motor speed is reduced. As another example, if the engine speed is expected to be higher than the predicted motor speed at a desired time of clutch engagement, or if the predicted synchronous motor speed is lower than the current motor speed, the controller may adjust one or more fuel, air, and spark to the engine to decrease engine acceleration. For example, fuel and/or air may be transiently decreased and spark timing may be advanced to decrease engine acceleration.

At 416, the routine determines if the engine speed and the motor speed are sufficiently close to each other. For example, it may be determined if they are substantially equal to each other or at least within a threshold of each other. If not, at 420, the routine maintains the disconnect clutch partially engaged and continues to adjust slippage of the clutch based on the difference between the engine speed and the motor speed. Else, at 422, the routine includes engaging the disconnect clutch when the engine speed is at or within a threshold of the expected motor speed. By engaging the disconnect clutch, the vehicle is transitioned into a hybrid mode of operation wherein the vehicle is propelled using at least some engine torque.

In one example, during an engine restart, a controller may slip a disconnect clutch between an engine and a motor while cranking the engine unfueled via the motor, and resume fueling of the engine only after an engine speed is above a threshold speed and engine acceleration is indicative of positive engine rotation. In addition, engine torque may be adjusted during the cranking and run-up responsive to a predicted motor synchronous speed. Herein, adjusting engine torque may include adjusting one or more of engine fuel, air, and spark to increase engine acceleration if the predicted motor synchronous speed is higher than current motor speed, and decrease engine acceleration if the predicted motor synchronous speed is lower than the current motor speed. In addition, the disconnect clutch may be engaged only after the engine speed of the fueled engine matches the predicted motor synchronous speed. Until the disconnect clutch is engaged, the clutch may be slipped, a degree of slipping of the disconnect clutch adjusted based on a difference between the engine speed and a motor speed during the cranking, and further based on a compression torque of the engine. This allows engine reversals during the cranking to be reduced. The engine acceleration being indicative of positive engine rotation includes the engine acceleration being higher than a threshold acceleration for greater than a threshold duration. This further assures that engine reversals do not occur when fueling is resumed in the engine. A controller may learn the slipping of the disconnect clutch at the engine restart as a function of one or more of engine age, ambient temperature, ambient humidity, and hydraulic fluid temperature. The learning may then be applied at subsequent engine restarts to improve restart smoothness.

Now turning to FIG. 5, an example engine starting sequence is shown. In particular, map 500 depicts an engine restart command at plot 502, DISG motor speed (dashed line) relative to engine speed (solid line) at plots 504-506 (on a common axis), motor torque (dashed line) relative to engine torque (solid line) at plots 510-512 (on a common axis), an engagement state of the disconnect clutch at plot 514, operator pedal position changes at plot 518, engine fueling at plot 522, and vehicle speed at plot 524. All plots are represented over time (increasing along the x-axis from the left side to the right side of each plot).

Prior to $T_1$, the hybrid vehicle may be operating in an electric mode with the vehicle being propelled using motor torque (plot 512). Thus, before $T_1$, changes in motor speed (plot 504) may mirror the changes in vehicle speed (plot 524).

At $T_1$, there may be a change in operator pedal position to a position requiring more torque. Herein, the torque demand may not be met by only the motor torque and additional engine torque may be required. Thus, at $T_1$, in response to the increase in torque demand, an engine restart command may be delivered (plot 502). In response to the engine restart command, the engine may be cranked via the motor with the disconnect clutch partially disengaged. As such, the disconnect clutch may have been fully disengaged prior to the engine restart to allow the motor to propel the vehicle. During the cranking, the disconnect clutch may be slipped (plot 514), a degree of slippage adjusted to provide a clutch torque capacity that allows the engine speed (plot 506) to be increased via motor torque (plot 510) while overcoming the compressor torque of the engine, and without affecting driveline torque to the wheels from the spinning engine. The motor torque may be transiently increased to provide sufficient torque to crank the engine and propel the vehicle. The engine speed may then be monitored during the cranking. For example, consecutive engine readings may be noted and compared.

Shortly after $T_1$, the engine speed may increase above threshold speed 508. Also between $T_1$ and $T_2$, the change in engine speed, as indicated by engine speed derivative 509, may indicate continued positive engine rotation. Specifically, derivative 509 may indicate that a direction of engine rotation has been in the forward direction for greater than a threshold duration, with no intermediate engine reversals.

In response to engine speed and engine rotational direction criteria being met, at $T_2$, engine fueling is resumed (plot 522), while maintaining the disconnect clutch partially disengaged via clutch slippage. In response to engine fueling, engine torque output may increase (plot 512). However, due to the engine speed not yet matching the synchronous motor speed, the disconnect clutch is not fully engaged.

Between $T_2$ and $T_3$, the engine speed and engine torque may continue to rise as cylinder combustion occurs following engine fueling. Clutch engagement may be desired at $T_4$. Based on the prevalent engine speed and engine acceleration (rate of change of engine speed), as well as the prevalent motor speed and motor acceleration (rate of change of motor speed), it may be predicted that the motor speed and engine speed will match at $T_5$, as indicated by the intersection of dashed and dotted segments 505 (predicted engine speed trajectory) and 507 (predicted motor speed trajectory). Consequently, disconnect clutch engagement may be delayed until $T_5$. At $T_3$, however, due to a sudden change in pedal position, the vehicle torque demand and vehicle speed may increase. Accordingly, motor torque may be increased to meet the torque demand. As a result of the increased need for motor torque, the motor speed trajectory may change with the motor speed increasing after $T_3$ (as indicated at plot 504) instead of decreasing after $T_3$ (as was expected at segment 507).

To enable the clutch engagement to still occur at $T_4$, as desired, between $T_3$ and $T_4$, the engine fueling is adjusted to adjust engine torque based on the motor synchronous speed. Specifically, engine fueling is transiently increased to raise the rate of increase in engine speed and enable the engine speed to match the synchronous motor speed at $T_4$.

It will be appreciated that if there was no change in pedal position at $T_3$ (as indicated by segment 520) and vehicle speed demand (as indicated by segment 526), engine fueling may have been maintained (as shown at segment 523), and the engine speed and motor speed may have become synchronous at or around $T_5$. Alternatively, engine fueling may have been adjusted after $T_3$ based on a difference between the engine speed and the motor speed to enable the clutch to be engaged at $T_4$.

At $T_4$, when the engine speed matches the motor synchronous speed, the disconnect clutch may be fully engaged to allow the engine to be coupled to the driveline and the vehicle to be propelled via the engine torque. Thus, at $T_4$, the vehicle may be transitioned from the electric mode to the hybrid mode.

Now turning to FIG. 6, another example engine starting sequence is shown. In particular, map 600 depicts an engine restart command at plot 602, DISG motor speed (dashed line) relative to engine speed (solid line) at plots 604-606 (on a common axis), motor torque (dashed line) relative to engine torque (solid line) at plots 610-612 (on a common axis), an engagement state of the disconnect clutch at plot 614, operator pedal position changes at plot 618, engine fueling at plot 622, and vehicle speed at plot 624. All plots are represented over time (increasing along the x-axis from the left side to the right side of each plot).

As with the example of FIG. 5, at map 600, prior to $T_{11}$, the hybrid vehicle may be operating in an electric mode with the vehicle being propelled using motor torque, and with motor speed mirroring vehicle speed. At $T_{11}$, as at $T_1$, there may be a change in operator pedal position to a position requiring more torque, responsive to which the engine is restarted. During the engine restart, the engine is cranked via the motor with the disconnect clutch partially disengaged, and with a degree of slippage of the clutch adjusted to provide a desired engine speed profile.

Shortly after $T_{11}$, the engine speed may increase above threshold speed 508. However, the change in engine speed shortly before $T_{12}$ may indicate engine reversal. In response to the indication of negative engine rotation, fueling of the engine is delayed. As such, if the engine were fueled during the engine crankshaft reversal, the engine speed may not cross through the compression torque and may stall, as indicated by segment 607. As such, this would result in a failed start due to roll back of the engine.

Between $T_{12}$ and $T_{13}$, the engine speed may be monitored to confirm that the engine speed remains above threshold 508 and the engine speed derivative 609 is indicative of continued positive engine rotation for more than a threshold duration. At $T_{13}$, both engine speed and engine forward direction rotation criteria may be met. At $T_{13}$, engine fueling may be resumed. Thus, in the example of FIG. 6, fueling of the engine is delayed until only after the engine speed is above the threshold speed and the direction of engine rotation is positive for greater than a threshold duration.

After resuming fueling at $T_{13}$, the disconnect clutch may be engaged at $T_{14}$, when engine speed matches the motor speed. Thus, at $T_{14}$, the vehicle may be transitioned from the electric mode to the hybrid mode.

In one example, a vehicle system comprises an electric motor; an engine; a disconnect clutch coupled in a driveline between the engine and the motor; and vehicle wheels configured to receive propulsion power from one or more of the engine electric motor and the engine via the driveline. The vehicle system may further comprise a controller including non-transitory executable instructions for receiving an engine restart request; and in response to the restart request, cranking the engine via the motor with the disconnect clutch at least partially disengaged while delaying fueling of the engine until each of an engine speed is above a first threshold speed and a direction of engine rotation is positive for greater than a threshold duration. In addition, while maintaining the disconnect clutch at least partially disengaged, the controller may adjust a clutch pressure or torque capacity of the disconnect clutch based on engine speed during the cranking, the clutch pressure or torque capacity increased when the engine speed is lower, the clutch pressure or torque capacity decreased when the engine speed is higher. The controller may include further instructions for, after fueling the engine, fully engaging the disconnect clutch when the engine speed is above a second threshold speed, the second threshold speed based on an expected motor speed.

In another example, an engine controller may monitor the engine restart speed and acceleration, as well the disconnect clutch pressure. The controller may modulate the clutch pressure as a function of the engine acceleration profile to maintain a consistent profile for a given restart when there is a change in the engine or clutch condition (such as for an engine with higher friction) or a change in the clutch friction material (such as when the number of clutch friction plates are increased or decreased).

In still another example, the controller may use clutch pressure as an inner feedback or control loop with desired engine speed/acceleration or clutch slip and rate of change of slip as the outer loop. Therein, the desired clutch apply pressure during the engine restart is adjusted as a function of the error in the desired engine speed trajectory. The actual clutch apply pressure may be measured or estimated. In this way, a desired engine speed trajectory may be used to calculated a desired clutch apply pressure. Separately, there may be a threshold applied on the clutch pressure gradient due to hydraulic or clutch HW issues.

The technical effect of delaying fueling of the engine until engine speed and engine rotational direction criteria are met is that vehicle stalls due to engine roll backs can be reduced. As such, this reduces the occurrence of failed engine restarts. In addition, fuel wastage during a transition from an electric mode to a hybrid mode of vehicle operation is reduced. Further, engine restart NVH issues are reduced. As such, this improves the overall engine restart quality.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
during a first engine restart,
cranking an engine via a motor with a disconnect clutch between the engine and the motor at least partially disengaged while delaying fueling of the engine until only after an engine speed is above a threshold speed and a direction of engine rotation is positive from a first time to a second, later time of the cranking, with no intermediate engine reversals, the engine fueling resumed while maintaining the disconnect clutch partially disengaged via clutch slippage; and
during a second engine restart,
cranking the engine via the motor with the disconnect clutch between the engine and the motor at least partially disengaged and with an intermediate engine reversal, while delaying fueling of the engine until only after the engine speed is above the threshold speed and the direction of engine rotation is positive from a third time to a fourth, later time of the cranking and after a threshold duration after the intermediate engine reversal, the engine fueling resumed while maintaining the disconnect clutch partially disengaged via clutch slippage.

2. The method of claim 1, wherein the direction of engine rotation being positive is based on engine restart crankshaft acceleration or a derivative of the engine speed once the engine starts rotating.

3. The method of claim 1, wherein the direction of engine rotation being positive is based on a series of engine speed readings from the first time to the second, later time having a progressively larger speed value.

4. The method of claim 1, wherein the disconnect clutch being at least partially disengaged includes the disconnect clutch being slipped, the method further comprising, in response to the engine speed being below the threshold speed, increasing motor torque supplied from the motor to crank the engine, and decreasing clutch slippage.

5. The method of claim 4, wherein the disconnect clutch being slipped includes a degree of slippage of the disconnect clutch being adjusted based on engine acceleration and a difference between engine speed and motor speed across the disconnect clutch to provide a desired engine speed profile, the method further comprising learning the degree of slippage during the engine restart as a function of one or more of engine age, ambient temperature, ambient humidity, and hydraulic fluid temperature.

6. The method of claim 1, further comprising, in response to an indication of engine reversal during the cranking, further delaying the fueling; and after the engine speed is above the threshold speed and the direction of engine rotation is positive from the first time to the second, later time, fueling the engine.

7. The method of claim 6, further comprising, after resuming fueling of the engine, fully engaging the disconnect clutch when the engine speed is at or within a threshold of an expected motor speed.

8. The method of claim 7, wherein the expected motor speed is predicted based on an expected transmission gear selection during the engine restart.

9. The method of claim 7, wherein the expected motor speed is predicted based on a derivative of actual motor speed after resuming fueling of the engine.

10. The method of claim 9, further comprising adjusting fueling and/or spark to the engine based on a difference between the engine speed and the expected motor speed, and further based on a derivative of the engine speed and a derivative of the expected motor speed after resuming the fueling.

11. The method of claim 10, wherein the adjusting includes increasing fueling and/or retarding spark timing to increase engine acceleration and reduce the difference between the engine speed and the expected motor speed when the engine speed is predicted to be lower than the expected motor speed at a time of clutch engagement; and decreasing fueling and/or advancing spark timing to decrease engine acceleration when the engine speed is predicted to be higher than the expected motor speed at the time of clutch engagement.

12. A method for a hybrid vehicle, comprising:
during an engine restart,
slipping a disconnect clutch between an engine and a motor while cranking the engine unfueled via the motor;
when an engine speed during the cranking is above a threshold speed and engine acceleration during the cranking is indicative of positive engine rotation with no intermediate negative engine rotation, resuming fueling of the engine at a first time of the cranking, while maintaining clutch slippage;
when an engine speed during the cranking is above the threshold speed and engine acceleration during the cranking is indicative of intermediate negative engine rotation, resuming the engine fueling at a second, later time of the cranking, after a duration since the negative engine rotation while the engine speed remains above the threshold speed and after the engine acceleration is indicative of positive engine rotation with no intermediate negative engine rotation, the engine fueling resumed while maintaining the clutch slippage; and
adjusting engine torque responsive to a predicted motor synchronous speed.

13. The method of claim 12, wherein the adjusting engine torque is further based on a derivative of the engine speed, and wherein the adjusting engine torque includes adjusting one or more of engine fuel, air, and spark to increase engine acceleration if the predicted motor synchronous speed is higher than a current motor speed, and decrease engine acceleration if the predicted motor synchronous speed is lower than the current motor speed.

14. The method of claim 13, further comprising fully engaging the disconnect clutch only after the engine speed of the fueled engine matches the predicted motor synchronous speed, wherein the predicted motor synchronous speed is predicted based on an expected transmission gear selection at a time of clutch engagement, the expected transmission gear selection predicted based on vehicle speed.

15. The method of claim 12, wherein a degree of slipping of the disconnect clutch is adjusted based on a difference between the engine speed and a motor speed during the cranking, and further based on a compression torque of the engine, the method further comprising learning disconnect clutch modulation including the degree of slipping as a function of the engine restart.

16. The method of claim 13, wherein the engine acceleration indicative of positive engine rotation includes the engine acceleration being higher than a threshold acceleration for more than a threshold duration of the cranking.

17. The method of claim 12, further comprising learning the slipping of the disconnect clutch at the engine restart as a function of one or more of engine age, ambient temperature, ambient humidity, and hydraulic fluid temperature.

18. A vehicle system, comprising:
an electric motor;
an engine;
a disconnect clutch coupled in a driveline between the engine and the electric motor;
vehicle wheels configured to receive propulsion power from one or more of the electric motor and the engine via the driveline; and
a controller including non-transitory executable instructions for:
receiving an engine restart request; and
in response to the restart request,
cranking the engine via the electric motor with the disconnect clutch at least partially disengaged; and
when there is no intermediate engine reversal during the engine cranking, delaying fueling of the engine to a first duration since initiating the engine cranking when each of an engine speed is above a first threshold speed and a direction of engine rotation is positive from a first time to a second, later time during the cranking;

when there is an intermediate engine reversal during the engine cranking, delaying fueling of the engine to a second, longer duration since initiating the engine cranking and after the intermediate engine reversal when each of the engine speed is above the first threshold speed and the direction of engine rotation is positive from a third time to a fourth, later time during the cranking; and maintaining the disconnect clutch partially disengaged via clutch slippage when the fueling of the engine is resumed.

19. The system of claim 18, wherein the controller includes further instructions for, while maintaining the disconnect clutch at least partially disengaged, adjusting a clutch torque capacity of the disconnect clutch based on engine speed during the cranking, the clutch torque capacity increased when the engine speed is lower, and the clutch torque capacity decreased when the engine speed is higher, wherein adjusting the clutch torque capacity includes adjusting a clutch pressure.

20. The system of claim 19, wherein the controller includes further instructions for, after fueling the engine, fully engaging the disconnect clutch when the engine speed is above a second threshold speed, the second threshold speed based on an expected motor speed, the second threshold speed higher than the first threshold speed.

* * * * *